United States Patent [19]

Tapola et al.

[11] 4,086,167
[45] Apr. 25, 1978

[54] BIOFILTER

[75] Inventors: Esko Tapola; Matti Sten; Onni Koistinen, all of Imatra, Finland

[73] Assignee: Enso-Gutzeit Osakeyhtio, Helsinki, Finland

[21] Appl. No.: 758,199

[22] Filed: Jan. 10, 1977

[51] Int. Cl.² ............................................. C02C 5/10
[52] U.S. Cl. .................................. 210/150; 210/170
[58] Field of Search ................ 210/17, 150, 151, 170, 210/15, 274, 283, 284, 290, 291–293

[56] References Cited

U.S. PATENT DOCUMENTS

| | | | |
|---|---|---|---|
| 681,884 | 9/1901 | Monjeau | 210/17 |
| 807,667 | 12/1905 | Dunbar | 210/17 |
| 2,301,025 | 11/1942 | Friend et al. | 210/150 |
| 2,317,782 | 4/1943 | Levine | 210/17 |
| 3,238,124 | 3/1966 | Burton | 210/150 |
| 3,293,174 | 12/1966 | Robjohns | 210/17 |
| 3,933,628 | 1/1976 | Varani | 210/170 |
| 4,005,010 | 1/1977 | Lunt | 210/17 |

Primary Examiner—Charles N. Hart
Assistant Examiner—Benoit Castel
Attorney, Agent, or Firm—Toren, McGeady and Stanger

[57] ABSTRACT

A biofilter for treatment of waste waters and gases, comprising a bed of coniferous tree barking residue containing microorganisms and where the waste water to be treated can be uniformly conducted upon the barking residue bed and from below the barking residue bed oxygen containing gas can be blown against the waste water flow. The barking residue bed has been partly placed in a depression provided liquid and gas tightly in the ground, and that on the bottom of the depression there is a pipe system for draining the waste water that has traversed the barking residue bed and for conducting oxygen containing gas into said bed.

3 Claims, 5 Drawing Figures

BIOFILTER

BACKGROUND OF THE INVENTION

The present invention concerns a procedure for rendering odourless the evil-smelling waste waters and waste gases generated in the cellulose industry. More specifically, the invention concerns a biofilter for carrying out the procedure disclosed in the Finnish Pat. No. 46,497.

In the above-mentioned Patent in the purification of waste waters and waste gases coniferous tree barking residues are utilized, through which the substances to be purified are conducted. The barking residue has been placed on trays permeable to liquid and gas and which have to support the barking residue layer in such manner that the liquids and gases can freely pass through the layer, however without any substance being permitted to run from the filtering layer and to follow along with the flowing liquid.

It was found, as realization of the invention was undertaken on a practical scale, that if the process is desired to have a sufficient capacity one is compelled to erect a comparatively large diameter structure of concrete or sheet steel, and this involves certain drawbacks. One of the major drawbacks is that the trays supporting the filtering layer and permeable to gas and liquid must be dimensioned to be comparatively strong and they must be heavily braced against the side walls. The result hereof is an expensive and massive construcion, because the structure has to be gas and liquid tight. Furthermore in view of best efficiency in the operation of the process, one has to provide for uniform distribution of liquid and gas and for removal of the purified liquid.

The aims of the invention have been achieved according to the invention in a simple way in that the filtering barking residue layer is placed in a depression made in the ground, whereby no concrete or sheet steel structure is required for side walls, instead of which the sides of the barking residue heap are lined with plastic fabric and upon the filtering layer a roof has been disposed so that the construction becomes liquid and gas tight.

The foregoing features and advantages of the present invention will become more apparent from a description of the invention in connection with the accompanying drawings and the characteristic features of the invention are covered in the appended claims.

BRIEF DESCRIPTION OF THE DRAWINGS

An embodiment of the invention is illustrated in the accompanying drawings, in which.

DESCRIPTION OF THE INVENTION

Figure 1:
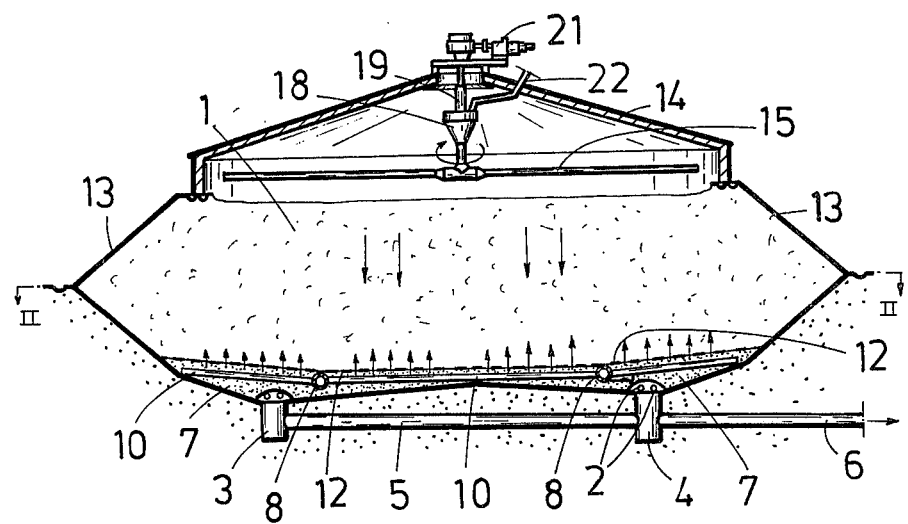
FIG. 1 is a schematic elevational section view showing the entire biofilter of the present invention.

Referring now in more detail to the accompanying drawings, the present invention provides for a barking residue bed 1, which has been heaped in a preferably circular pit made in the ground and which has sides sloping towards the centre. On the bottom of the pit the underdrain pipes 2 run in a circuit above the wells 3 and 4. The well 3 has been connected by a sloping pipe 5 with the well 4, from which the water can escape to the drain 6. On the bottom of the pit, a layer 7 of screened gravel of grain size 8 to 16 mm has been doposited so that this bed readily allows the water to pass through into the underdrain pipe 2. Embedded in the gravel is a circular pipe 8 for distribution of a gas containing oxygen, which is supplied through the input pipe 9. Branch pipes 10 extend radially from the distribution pipe both inwardly and outwardly, and these have been provided on their topside with holes 11 for gas flow. Upon the gravel bed 7 a net 12 made of plastic has been laid out, through which both the liquid flow and the gas flow pass without trouble, but which still prevents the matter in the barking residue bed 1 from plugging the air holes 11 of the pipe 10. The gravel bed 7 in its turn carries the barking residue bed 1 in such manner that the air pipes 8 and 10, made of plastic, are not damaged by the weight of the bed 1. To the barking residue bed 1 bodies, which minimally affect the micro-organism activity and serve to reduce its compactness, or to loosen it, are added, such as e.g. pine cones or pieces of unbarked tree limbs, by effect of which the barking residue is made readily permeable to liquid and gas, whereby the waste water can without obstruction drain into the underdrain pipe 2.

The filtering bed 1 is protected on its sides by a plastic fabric 13 and on top, by a roof 14, whereby the structure is gas and liquid tight with the exception of an aperture (not depicted) through which the gas flow that has passed through the filtering bed is voided from the structure, either into the atmosphere or to another step. To the roof 14 the horizontal spray pipe 15 has been affixed, the waste water to be treated discharging from its nozzles 16 (FIG. 3) onto the filtering bed 1.

Figure 3:
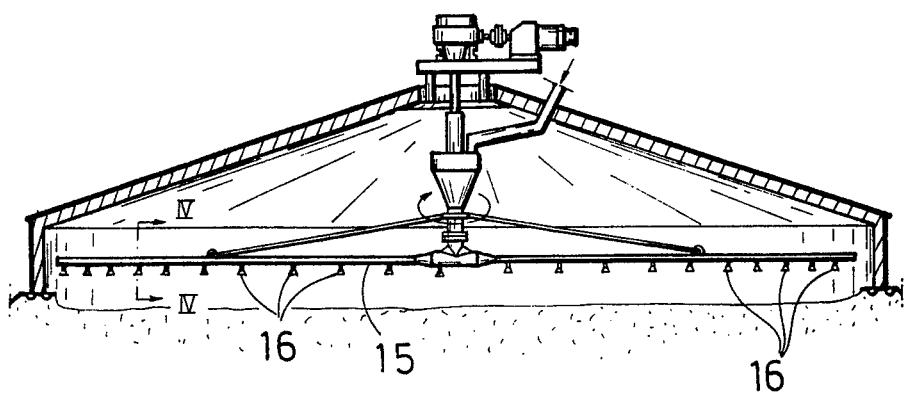
FIG. 3 is a partial elevational view shown in section showing the upper part of the biofilter with its spray pipe.
Figure 4:
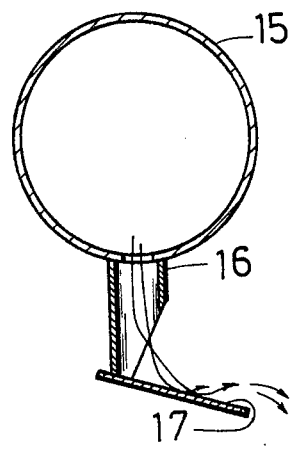
FIG. 4 is a cross-sectional view of the spray pipe taken along lines IV—IV in FIG. 3.
Figure 5:
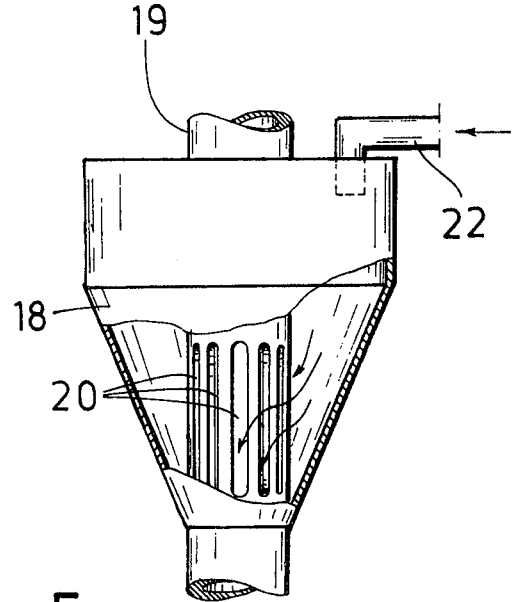
FIG. 5 shows the feed cone of the spray pipe on an enlarged scale.

The spray pipe 15 has been provided with nozzles 16, on one margin of which a plate 17 has been affixed, which distributes the waste water over a wider area. As shown in FIG. 3, the nozzles are located on both branches of the spray pipe 15 asymmetrically with reference to the centre.

The waste water to be treated is conducted into the spray pipe 15 from the pipe 22 through the feed cone 18, the holes 20 in the tube 19 housed in this cone allowing the water to distribute uniformly into the spray pipe 15. The tube 19 has been connected through a speed reduction gear with the motor 21.

The biofilter of the invention operates as follows. The waste water to be treated, which may, for instance, be evil-smelling sulphurous condensate from the manufacturing process of sulphate cellulose, is brought by the pipe 22 into the feed cone 18 of the spray pipe 15, whence it can further be evenly distributed into both branches of the spray pipe 15 through the holes 20. If the nozzles 16 are plugged owing to heavy pollution of the waste water, the water can still reach the filtering bed by overflow. With the spray pipe rotating at a comparatively low speed, as in FIG. 1 in a clockwise direction, the water discharges through the nozzles 16, the oblique baffles 17 flinging the water backwardly over a comparatively wide area. It is important, in view of the operation of the filter, that the filtering bed remains uniformly wet at every point. In view hereof the nozzles 16 are asymmetrically mounted on the spray pipe 15 with reference to the center, so that the nozzles on one side might not spray water on the same area as those mounted on the other side.

While running through the filtering barking residue bed 1, the microorganisms present therein cause biological oxidation of the compounds in the waste water. Hereby such sulphur compounds for instance as hydrogen sulphide, methyl mercaptan, dimethylsulphide and dimethyldisulphide, all of which occur in the condensate waters of a sulphate cellulose evaporation plant, become odourless, whereby the end products consist of sulphates. In order to maintain the permeability of the barking residue bed, bodies for loosening this bed have been placed therein, which affect the microorganism activity as little as possible. Such bodies are preferably of biological origin, and in the first place one may consider pine cones, which are sprinkled in dry condition into the barking residue bed when this bed is being made. Particles of the barking residue will be impacted between the pegs of the dry pine cone, whereby the cone cannot close as it becomes wet and, instead, remains almost fully open. The surface occupied by the cones in the barking residue bed is so large that the filtering bed becomes loose and the liquids and gases to be filtered can easily pass through the bed. As the filtering bed undergoes humidification the cones are humidified along with it, and therefore they need not be removed. Other materials of biological origin that may be contemplated are, above all, pieces hacked from tree limbs with their bark intact; these loosen up the barking residue bed as they become crosswise positioned therein. The looseness may also be increased by the aid of tubular pieces of the cardboard cores of paper rolls. Furthermore, pieces of plastic tubing may be contemplated as loosening material. In the case of using plastic material however, the growth of microorganisms only takes place on the plastic surface, and one therefore has to take care in this case that the surface occupied by the pieces is such that the growth of the microorganisms will not stop without additional nutrients being added.

Figure 2:
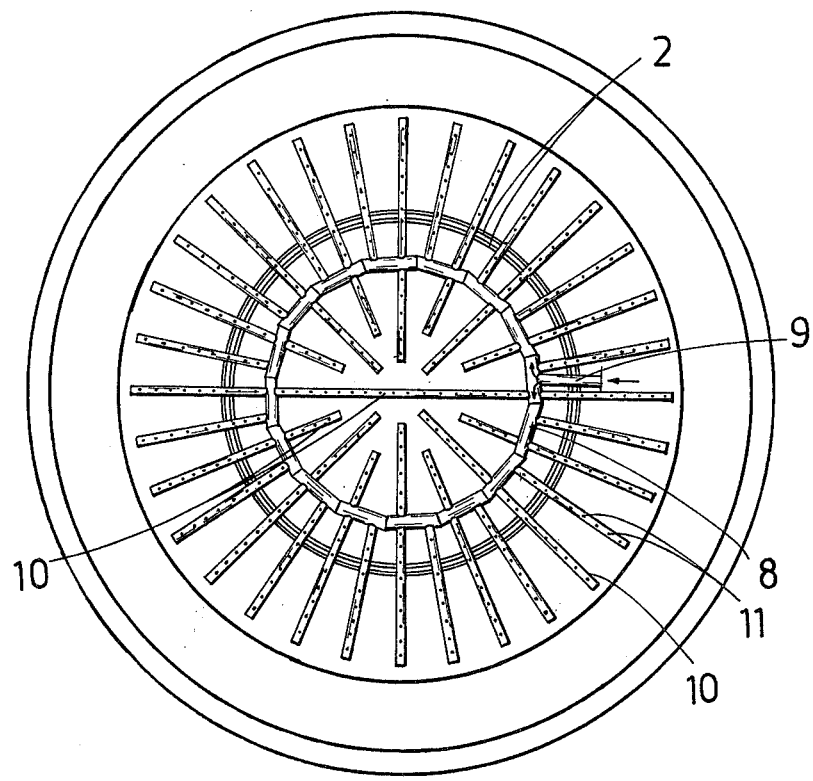
FIG. 2 is a sectional view taken along lines II—II of FIG. 1.

The microorganism action also needs oxygen. This is introduced through a pipe system of the kind shown in FIGS. 1 and 2, on the bottom of the filtering bed. The distribution tube 8 is supplied through the input pipe 9 with air or with oxygen containing waste gas, which may also contain sulphurous compounds. When using such oxygen containing waste gas one may also achieve purification of the waste gases to become odourless, with the aid of microorganisms. The oxygen-containing gas to be used is distributed from the distribution tube 8 into the outward and inward pointing radial branch pipes 10, which have been perforated, 11, on their topside so that the gas may freely and uniformly discharge over the whole area of the filtering bed. For conduction into the filtering bed 1, a net 12 made of plastic is used, which has a mesh such that the gas and liquid flow have easy passage therethrough. The gas that has passed through the filtering bed 1 is conducted either into the atmosphere or into a second similar biofilter. The purified water, again, that has passed through the filtering bed 1, passes through the readily perfused gravel bed 7 and it is collected in the underdrain pipes 2, which encircle the bottom of the filtering bed 1. The underdrain pipes 2 run over the drain wells 3 and 4, collecting in these the liquid that arrives through the filtering bed 1. The drain well 3 is connected with the well 4 by the pipe 5, and from the latter well the purified water is removed to the drain through the pipe 6.

The invention is not confined to the embodiment presented here, but it may be modified within the scope of the claims. For instance, in certain cases the plastic net 12 may even be omitted, whereby the waste water to be filtered has direct access from the barking residue bed to the gravel bed 7 and thence through the underdrain pipes 2 to the wells 3 and 4.

We claim:

1. An improved biofilter for the treatment of waste water and gases comprising a depression formed in the ground, a layer of gravel permeable to both liquid and gas carried on the bottom of said depression, a bed of coniferous tree barking residue containing micro-organisms carried within said depression and supported on said layer of gravel for passing waste water to be treated therethrough, said bed of barking residue extending above the top of said depression in a heap having sloping side walls, a plurality of articles which minimally affect the micro-organism activity distributed within said bed of barking residue to reduce compactness thereof to render said bed of barking residue more permeable to liquid and gas so as to facilitate the passage of waste water therethrough, said articles being selected from the group consisting of pieces of plastic, pine cones, pieces of tree limbs with the bark thereof intact, and tubular pieces of paper roll cores, a plastic fabric lining said sloping side walls, a roof covering the top of said heap, means supported by said roof for uniformly distributing waste water to be treated upon said bed of barking residue, said distributing means including a spray pipe mounted in said roof for rotation in a substantially horizontal plane about a vertical axis of rotation, said spray pipe having a plurality of nozzles distributed therealong, a deflection plate associated with each nozzle, a tube having a plurality of holes therein connected with said spray tube to supply said waste water thereto, a feed cone surrounding a portion of said tube, and a pipe communicating with said feed cone for supplying waste material thereto for uniform distribution into said spray pipe, a pipe system of substantially radially extending perforated pipes embedded in said layer of gravel and located directly beneath said bed of barking residue for blowing gas containing oxygen against the flow of waste water through said bed, an exhaust valve carried by said roof by exhausting the gas blown by said pipe system which has passed through said bed of barking residue, a system of underdrain pipes located at the bottom of said depression below said pipe system embedded in said layer of gravel for collecting treated water which has traversed said bed of barking residue, and drain wells communicating with said underdrain pipes for draining said treated water.

2. The biofilter according to claim 1 wherein said pipe system for blowing gas containing oxygen comprises a circular pipe and a plurality of perforated branch pipes radially extending from said circular pipe in a substantially horizontal plane both inwardly and outwardly from said circular pipe.

3. The biofilter according to claim 1 wherein said system of underdrain pipes are circularly embedded in said layer of gravel located below said pipe system for blowing said gas and extend over said drain wells.

* * * * *